UNITED STATES PATENT OFFICE.

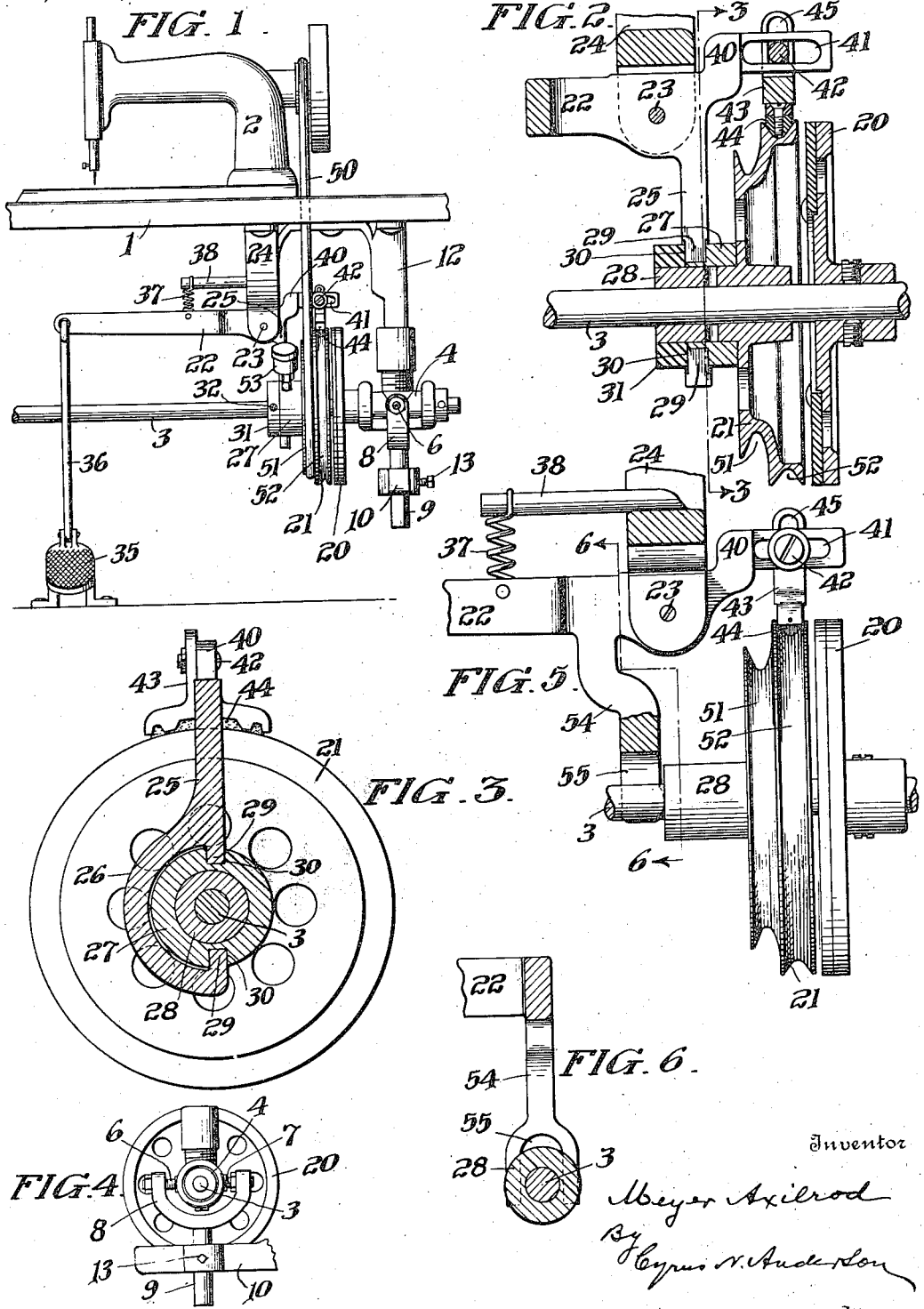

MEYER AXILROD, OF NEW YORK, N. Y.

CLUTCH AND BRAKE MECHANISM.

1,188,385. Specification of Letters Patent. Patented June 27, 1916.

Application filed January 18, 1916. Serial No. 72,674.

*To all whom it may concern:*

Be it known that I, MEYER AXILROD, a citizen of the United States, residing in the city and county of New York, State of New York, have invented certain new and useful Improvements in Clutch and Brake Mechanism, of which the following is a specification.

My invention has for one object to provide a clutch actuating lever having an arm projecting therefrom and rigidly secured thereto for supporting a brake device for acting upon a driving mechanism.

A further object of my invention is to provide means for adjusting the said brake device to different positions whereby it may be placed in position to properly act upon the driving device even though the position of the latter may be changed relatively to other portions of the apparatus of which it may form a part.

In the drawings I have shown my invention as employed in connection with mechanism for driving one or more sewing machines although it will be understood that it may be employed in connection with other kinds of machines and for other purposes.

In the accompanying drawings I have shown convenient forms of embodiment of my invention but it will be understood that the same is susceptible of being embodied in other forms of construction within the scope of the claims and that my invention is not limited to the details of construction as illustrated.

In the drawings: Figure 1 is a side elevation of a portion of apparatus embodying my invention; Fig. 2 is a central vertical section, taken in a direction parallel to the driving shaft, of a portion of the apparatus shown in Fig. 1; Fig. 3 is a transverse section taken on the line 3—3 of Fig. 2; Fig. 4 is a view looking toward the left in Fig. 1 and showing in end elevation a portion of the apparatus illustrated in said figure including the means for adjustably supporting the driving shaft; Fig. 5 is a view partly in vertical section and partly in side elevation showing a modified construction of apparatus embodying my invention; and Fig. 6 is a transverse sectional view taken on the line 6—6 of Fig. 5.

In the drawings, 1 designates the table of a sewing machine, and 3 the driving shaft by which said machine and also such additional machines as may be connected therewith may be driven. The said shaft is supported upon bearings 4, only one of which is shown in the drawings. The said bearings are each supported between the opposing ends of the adjustable bolts 6 and 7 which have adjustable connection with the ends of the yoke-shaped end portion 8 of the rod or bar 9 which is adjustablv secured in the laterally extending portion 10 at the lower end of the bracket 12 which is secured to the under side of the table 1. The adjustable rod or bar 9 may be secured in adjusted position by means of the binding screw bolt 13. By adjusting the screw bolts 6 and 7 it is apparent that the bearing 4 may be adjusted laterally. It is also apparent that the said bearing may be adjusted vertically by moving the rod or bar 9 up or down.

The clutch member 20 is secured to the shaft 3. The driving wheel 21 is slidably mounted upon said shaft and is adapted to be moved into contact with the opposing frictional surface of the clutch member 20 whereby when the said driving wheel 21 is moved into position against the said clutch member 20 it is caused to rotate therewith.

22 designates a clutch lever which is pivoted at 23 upon the lower end of a projection 24 which, in the construction shown, is integral with the depending bracket 12. It is apparent, however, that the said parts 12 and 24 may be made separate from each other and supported independently upon the table 1 or any other support. The said clutch lever 22 is provided with a downwardly projecting arm 25 having a semicircular offset portion 26 which encircles one side of a sleeve 27 loosely mounted upon an extension of the hub 28 of the driving wheel 21.

29 designates projections formed upon the said arm 25 which projections engage notches 30 in the ring 27. It may be noted that the said ring is held in position upon the extension of the hub 28 by means of a collar 31 secured, by means of a binding screw 32, upon the outer end of said extension.

For the purpose of operating the said lever 22 I have provided a treadle 35 connected with the outer end of the said lever by means of a rod 36. The outer end of said lever is held in its uppermost position by means of a coiled wire spring 37 which is attached at one end to the said lever and at its other to a fixed projection 38 extending laterally from the downwardly extending projection or bracket 24. By reason of the engagement of the projection 29 with the notches 30 in the sleeve 27 it is apparent that the latter is held against rotation notwithstanding the rotation of the driving wheel 21.

40 designates an arm extending from the lever 22, said arm extending over and being positioned a distance above the driving wheel 21. It is provided with a slot 41 in which is adjustably secured by means of a fastening bolt 42 a support 43 for a brake 44. The support 43 is also slotted as indicated at 45. It is apparent, therefore, that the brake support 43 and the brake carried thereby may be adjusted either toward the right or the left (having reference to Figs. 1 and 2) and also vertically, that is to say, transversely of the arm 40. It is found in practice that the clutch member 20 and the driving wheel 21 may be situated in different positions upon the shaft 3. In such cases it is necessary that the brake for coöperating with and acting upon the driving wheel should be correspondingly adjusted. It is for that reason that the slot in the arm 40 is provided.

In adjusting the shaft 3 the same may be also raised or lowered by the adjustment of the rod or bar 9. In such case it is necessary that the brake be correspondingly adjusted and it is for that reason that I have provided the slot 45 in the brake support 43. It is apparent, therefore, that I have provided means whereby even though the clutch member and the driving wheel may be either raised or lowered or placed in different positions upon the shaft 3 the brake may be correspondingly adjusted so as to place the parts in proper operative relation with respect to each other.

For the purpose of driving the sewing machine mechanism from the driving shaft 21 I have provided a driving band 50 which may be of a length either to operate in the groove 51 or 52 in the driving wheel.

For the purpose of lubricating the surfaces between the sleeve 27 and the extension of the hub 28 I have provided a lubricant cup 53 into which a lubricant may be placed for lubricating the said surfaces.

In Figs. 5 and 6 I have shown a slightly modified construction in which the lower end of the arm 54 depending from the lever 22 is bifurcated as indicated at 55 which bifurcations are positioned on opposite sides of the driving shaft 3 and are adapted to contact with the outer end of the extension 28 of the driving wheel 21. In this latter construction the sleeve or ring 27 is omitted; otherwise the constructions shown in Figs. 1 to 4 and Figs. 5 and 6, respectively, are the same.

I claim:—

1. The combination of a clutch member, a driving wheel, a lever for throwing the said driving wheel into and out of engagement with said clutch member said lever having an arm extending therefrom transversely of the planes of said clutch and driving wheel and in proximity to the peripheries thereof, a brake, a brake support, and means whereby said support may be adjusted both longitudinally and transversely of said arm, said brake being adapted to be automatically released from the said driving wheel as the latter is moved into engagement with the said clutch member.

2. In combination, a clutch member, a driving wheel situated in operative relation thereto, a pivoted lever having means for causing relative movement between said driving wheel and the said clutch member to cause engagement of the said wheel and the said clutch member, an arm extending from said lever transversely of said driving wheel and clutch member and being situated a distance from the peripheries thereof, said arm being provided with a slot, a brake, a support for said brake, and means extending through said slot and being adapted to be adjustably positioned therein for securing and holding the said brake support in different positions in respect of said arm and with relation to the peripheries of the said driving wheel and clutch member.

3. In combination, a driving shaft, a clutch member secured to said shaft, a driving wheel slidably supported upon said shaft, a lever pivoted intermediate its ends one portion of which is operatively connected with the said driving wheel, means for operating the said lever to cause movement of said driving wheel into engagement with the said clutch member, an arm projecting from said lever transversely of said driving wheel and said clutch member, said arm being provided with an elongated slot, a brake support also provided with an elongated slot, means extending through said slots for adjustably connecting the said support to said arm, substantially as and for the purpose described.

4. In combination, a driving shaft, means for supporting the said driving shaft, said means including devices for adjusting said shaft both upwardly and horizontally, the said shaft being also adjustable axially, a clutch member and a driving wheel on said shaft, means for causing relative movement between said driving wheel and said clutch member whereby said driving wheel and clutch member may be moved into and out of engagement, a brake for engaging said driving wheel, a support for said brake, and means for adjustably supporting the said brake support whereby the latter may be adjusted to correspond with adjustments of said shaft.

In testimony that I claim the foregoing as my invention, I have hereunto signed my name this 17th day of January, A. D. 1916.

MEYER AXILROD.